United States Patent
Chokshi et al.

(10) Patent No.: US 7,779,423 B2
(45) Date of Patent: Aug. 17, 2010

(54) DETECTING ENTITY CHANGES IN A STORAGE AREA NETWORK ENVIRONMENT

(75) Inventors: Ashmi Ashokkumar Chokshi, Santa Clara, CA (US); Sandeep Gopisetty, Morgan Hill, CA (US); Glen Hattrup, Overland Park, KS (US); David Lynn Merbach, Rochester, MN (US); Sumant Padbidri, San Jose, CA (US); Prasenjit Sarkar, San Jose, CA (US); Soumitra Sarkar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 11/556,509

(22) Filed: Nov. 3, 2006

(65) Prior Publication Data
US 2008/0109822 A1    May 8, 2008

(51) Int. Cl.
G06F 3/00 (2006.01)
G06F 9/44 (2006.01)
G06F 9/46 (2006.01)
G06F 13/00 (2006.01)

(52) U.S. Cl. ..................... 719/318; 707/674

(58) Field of Classification Search ................ 707/203, 707/10; 709/225; 719/318
See application file for complete search history.

(56) References Cited

U.S. PATENT DOCUMENTS

| | | | |
|---|---|---|---|
| 6,934,826 B2 | 8/2005 | Lubbers et al. | 711/170 |
| 7,333,982 B2 * | 2/2008 | Bakalash et al. | 707/5 |
| 7,444,355 B1 * | 10/2008 | Clark et al. | 707/104.1 |
| 2002/0095602 A1 * | 7/2002 | Pherson et al. | 713/201 |
| 2003/0018229 A1 | 1/2003 | Vaughn et al. | 585/639 |
| 2003/0149769 A1 * | 8/2003 | Axberg et al. | 709/225 |
| 2003/0177168 A1 * | 9/2003 | Heitman et al. | 709/201 |
| 2004/0068561 A1 * | 4/2004 | Yamamoto et al. | 709/224 |
| 2005/0004979 A1 | 1/2005 | Berkowitz et al. | 709/203 |
| 2005/0193105 A1 | 9/2005 | Basham et al. | |
| 2005/0223183 A1 | 10/2005 | Pherson et al. | 711/163 |
| 2006/0041656 A1 | 2/2006 | Li et al. | 709/223 |
| 2006/0071684 A1 * | 4/2006 | Schwarz et al. | 326/39 |

FOREIGN PATENT DOCUMENTS

| WO | WO 2005008633 A2 | 1/2005 |
|---|---|---|
| WO | WO 2007096287 A1 | 8/2007 |

* cited by examiner

*Primary Examiner*—Pierre M Vital
*Assistant Examiner*—Sabana Rahman
(74) *Attorney, Agent, or Firm*—Kunzler Needham Massey & Thorpe

(57) ABSTRACT

An apparatus, system, and method are disclosed for detecting entity changes in a storage area network. A discovery module probes a plurality of entities of the storage area network to detect an event in response to a policy, stores attributes of the probed entities, and reports the event with a probe event reference. A monitor module receives a self-announced event reference of the event if an entity communicates the event. A configuration module records the event as an initiated event reference if the event is initiated by an administrator. An event manager synthesizes a report of the event from the event references.

35 Claims, 8 Drawing Sheets

DETECTING ENTITY CHANGES IN A STORAGE AREA NETWORK ENVIRONMENT

BACKGROUND OF THE INVENTION

1. Field of the Invention

This invention relates to detecting entity changes and more particularly relates to detecting entity changes in a storage area network environment.

2. Description of the Related Art

Storage area networks (SAN) are increasingly popular for storing large quantities for data. A SAN includes multiple entities such as hosts, storage subsystems, host bus adapters, storage volumes, storage pools, etc., as well as relationships between them such as links. In this document, the term "entity" is used to refer to both entities and relationships. The state of these entities is always in flux. Entities may be created or deleted, or the attributes of the entities change in response to events in a SAN.

A change to an entity is referred to herein as an event. Entities have one or more attributes such as storage capacity, available communication channels, read and/or write latency, and the like. An entity attribute change may be an event. For example, the addition of a hard disk drive to a storage subsystem comprising a plurality of hard disk drives may increase the storage capacity of the storage subsystem, changing an attribute of the storage subsystem entity.

An event may also include the creation or deletion of an entity within the SAN. Creation as used herein refers to an entity beginning communications with the SAN while deletion as used herein refers to an entity terminating communications with the SAN. As used herein, an entity that communicates within the SAN is referred to as being visible within the SAN. An event may include an entity previously visible within the SAN becoming no longer visible within the SAN. In one embodiment, the entity is no longer visible within the SAN if the entity cannot be communicated with. Alternatively, the entity is no longer visible within the SAN if the entity is not present within the SAN.

A system managing a SAN requires an efficient mechanism to process events in the SAN and inform an administrator about the changes to the entities in the SAN. It is particularly important to inform the administrator about changes to entities in the SAN that are of the interest to the administrator. For example, a SAN might include a million or more entities, but the administrator might be interested in only a subset of entities that are critical to the operation of a data center.

In the past, entities have generated raw reports of events and communicated the reports directly to a console used by the administrator. The administrator may filter the reports, so that only entities of interest are displayed. Unfortunately, duplicate reports relating to a single event are common, making it difficult for the administrator to identify critical events.

An entity may also periodically communicate a report to the administrator detailing the entity's status. The administrator may have difficulty identifying changes in the entity's status from the plurality of status reports that are received. As a result, critical changes to the entity and/or the entity's attributes may go unnoticed.

Management systems have attempted to make events more visible to the administrator by comparing status reports with a baseline status report. Unfortunately, meaningful baselines are not always available for the entities of a SAN system. As a result, many events are unrecognized by the administrator even when status reports are compared with baseline reports.

In addition, some events may not result in the generation of reports. For example, if an entity is deleted or is no longer visible within the SAN, the entity may not generate and/or communicate a report to the administrator. As a result, many events may not be reported at all to the administrator. Similarly, the creation of an entity within the SAN such as the addition of a host may not generate a report.

From the foregoing discussion, it should be apparent that a need exists for an apparatus, system, and method that detects entity changes in a SAN. Beneficially, such an apparatus, system, and method would provide useful management information to the SAN administrator.

SUMMARY OF THE INVENTION

The present invention has been developed in response to the present state of the art, and in particular, in response to the problems and needs in the art that have not yet been fully solved by currently available entity change detection methods. Accordingly, the present invention has been developed to provide an apparatus, system, and method for detecting entity changes that overcome at least one of the above-discussed shortcomings in the art.

The apparatus to detect entity changes is provided with a plurality of modules configured to functionally execute the steps of probing a plurality of entities of a storage area network (SAN), receiving a self-announced event reference, recording the event as an initiated event reference, and synthesizing a report. As used herein, a self-announced event reference is an event reference communicated by the entity that experiences the event. These modules in the described embodiments include a discovery module, a monitor module, a configuration module, and an event manager. The apparatus may also include a mapping module, a detectability module, a change detection module, an entity data set, a snapshot data set, and a preference data set.

The discovery module probes a plurality of entities of a SAN to detect an event in response to a policy. The event may be an attribute change for an entity, a new entity becoming visible within the SAN, and an entity previously visible within the SAN becoming no longer visible within the SAN. In one embodiment, the entity is no longer visible within the SAN if the entity cannot be communicated with. Alternatively, the entity is no longer visible within the SAN if the entity is not present within the SAN.

The monitor module receives a self-announced event reference of the event if an entity communicates the self-announced event reference. The configuration module records the event as an initiated event reference if the event is initiated by an administrator. The event manager synthesizes a report of the event from the event references.

The mapping module stores attribute data for entities in the entity data set. The entity data set, snapshot data set, and preference data set may each be configured as a database, a linked array of data fields, a flat file, or the like and store entity related data. In one embodiment, the detectability module determines that an entity is not visible within the SAN in response to the event. The change detection module may store attribute data for a snapshot of the entity data set in the snapshot data set. The event manager may receive selection of one or more entities of interest from the administrator.

The apparatus detects entity changes in the SAN by synthesizing the report from one or more event references of the event. The report is not limited to self-announced and/or initiated event references, but may also include probed event references from probing the SAN and events discovered from differences between the entity data set and the snapshot data set. Thus, the administrator may learn the status of all or selected entities of the SAN without parsing through redundant event references.

A system of the present invention is also presented to detect entity change. The system may be embodied in a data processing system. In particular, the system, in one embodiment, includes a SAN and a manager node.

The SAN includes a plurality of entities such as storage subsystems, hosts, host bus adapters, storage volumes, storage pools, and the like. The manager node may be a computer workstation, a server, or the like. In addition, the manager node manages the SAN. The manager node includes a discovery module, a monitor module, a configuration module, and an event manager.

The discovery module probes the entities of the SAN to detect an event in response to a policy, stores attributes of the probed entities, and reports the event with a probe event reference. The monitor module receives a self-announced event reference of the event if an entity communicates the self-announced event reference. The configuration module records the event as an initiated event reference if the event is initiated by an administrator. The event manager synthesizes a report of the event from the event references. The system detects changes to the SAN, reporting a change as consolidated event reference to the administrator.

A method of the present invention is also presented for detecting entity changes. The method in the disclosed embodiments substantially includes the steps to carry out the functions presented above with respect to the operation of the described apparatus and system. In one embodiment, the method includes probing a plurality of entities of a SAN, receiving a self-announced event reference, recording the event as an initiated event reference, and synthesizing a report.

A discovery module probes a plurality of entities of a SAN to detect an event in response to a policy and stores attributes of the probed entities. A monitor module receives a self-announced event reference of the event if an entity communicates the self-announced event reference. A configuration module records the event as an initiated event reference if the event is initiated by an administrator. An event manager synthesizes a report of the event from the event references. The method detects changes to the SAN by reporting events including events that are not self-announced by entities and initiated by the administrator.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention detects changes to entities in a SAN. In addition, the present invention may synthesize a concise report of the events comprising each change. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices or other computer usable media. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
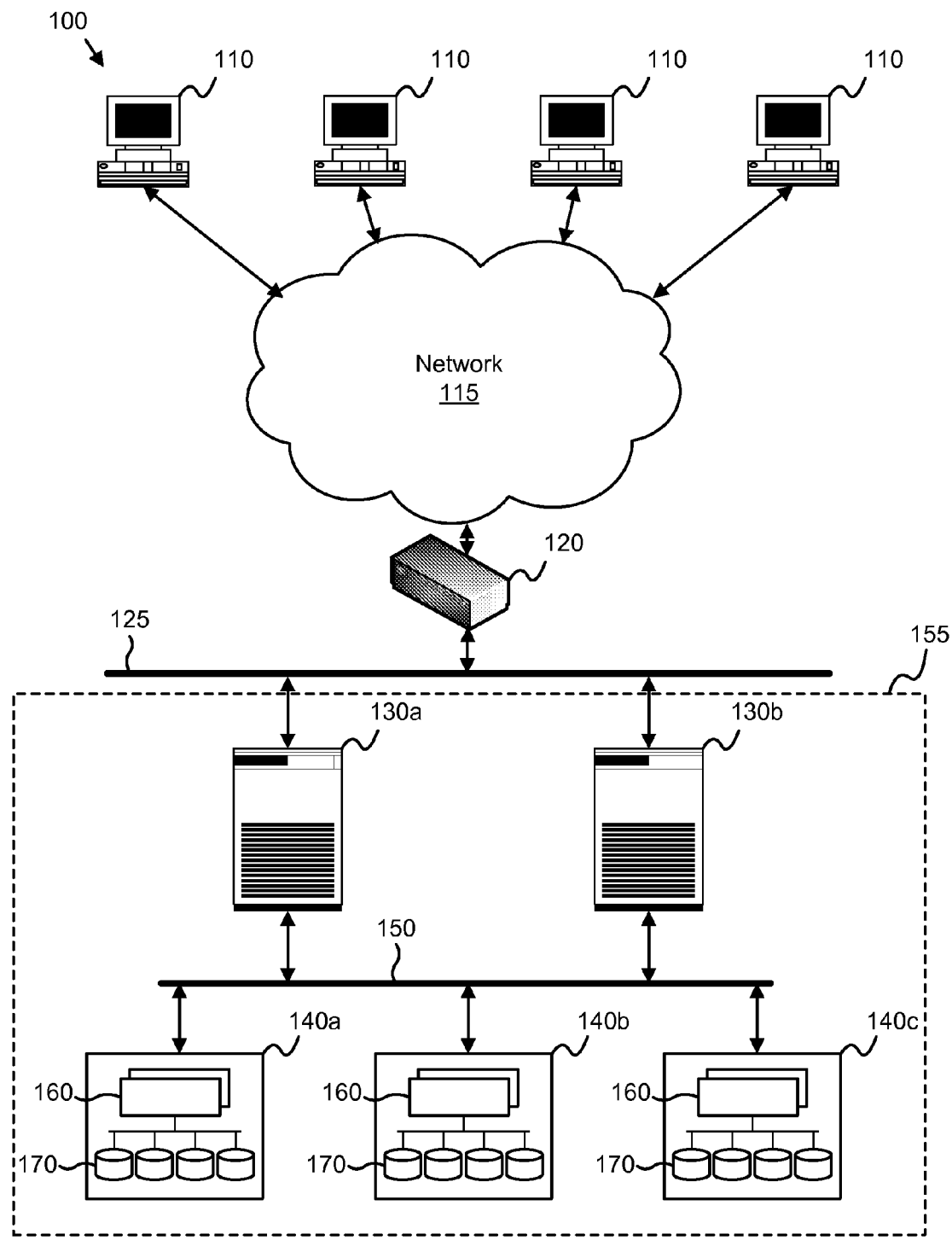
FIG. 1 is a schematic block diagram illustrating one embodiment of a data processing system in accordance with the present invention.

FIG. 1 is a schematic block diagram illustrating one embodiment of a data processing system 100 in accordance with the present invention. The system 100 includes one or more hosts 110, a network 115, a bridge 120, a local area network (LAN) 125, one or more storage servers 130, a storage network 150, and one or more storage subsystems 140. Each storage subsystem 140 may include one or more storage controllers 160 that manage one or more storage devices 170.

The hosts 110 may be mainframe computers, servers, computer workstations, laptop computers, personal digital assistants, cellular telephones, or the like. The network 115 may be the Internet, a wide area network, or the like.

In one embodiment, the storage servers 130, storage network 150, and storage subsystems 140 comprise a storage area network (SAN) 155. The SAN 155 may store and retrieve data for the hosts 110. For example, the SAN 155 may store an enterprise database application for the hosts 110. Alternatively, the SAN 155 may store individual and group data sets for the hosts. For example, the SAN 155 may store a financial data set for a host 110. The storage devices 170 may be configured as hard disk drives, optical storage devices, magnetic tape drives, micromechanical storage devices, semiconductor storage devices, and the like.

The hosts 110, bridge 120, storage servers 130, and storage subsystems 140 are each examples of entities. An entity may be any device that is in communication with the SAN 155 and/or that may communicate with the SAN 155. Although for simplicity the SAN 155 is shown with one two storage servers 130 and three storage subsystems 140 in communication with four hosts 110, the SAN 155 may include any number of storage servers 130, storage subsystems 140, and hosts 110. The SAN 155 may also include other devices not shown for simplicity such as host bus adapters, routers, switches, and the like. In addition, the SAN 155 may be organized with logical constructs such as logical storage volumes, storage pools, and the like as are well known to those skilled in the art.

Figure 2:
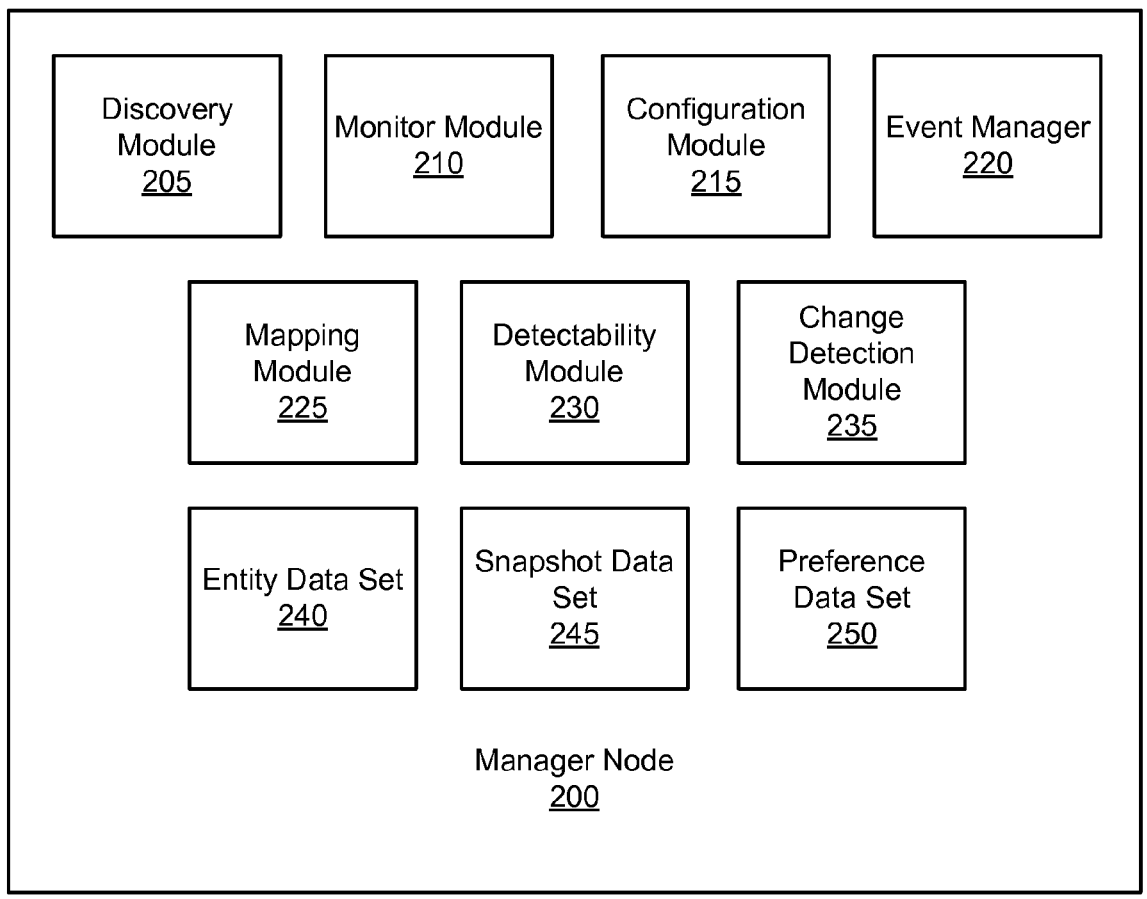
FIG. 2 is a schematic block diagram illustrating one embodiment of a manager node of the present invention.

FIG. 2 is a schematic block diagram illustrating one embodiment of a manager node 200 of the present invention. The manager node 200 may be embodied in a host 110 of FIG. 1. For example, the manager node 200 may be embodied in a computer workstation host 110. The description of the node 200 refers to elements of FIG. 1, like numbers referring to like elements. The node 200 includes a discovery module 205, monitor module 210, configuration module 215, event manager 220, mapping module 225, detectability module 230, change detection module 235, entity data set 240, snapshot data set 245, and preference data set 250.

In one embodiment, the discovery module 205, monitor module 210, configuration module 215, event manager 220, mapping module 225, detectability module 230, and change detection module 235 are configured as one or more software processes executing on the host 110 as is well known to those of skill in art. For example, a memory array may store the software processes and one or more processors may execute the software processes. In addition, the software processes may communicate with an administrator through a monitor and input devices such as a keyboard and/or mouse.

The discovery module 205 probes a plurality of entities of the SAN 115 to detect an event in response to a policy. For example, the discovery module 205 may probe the storage subsystem 140 and detect the event of the storage capacity attribute of the storage subsystem changing from one terabyte (1 TB) to two terabytes (2 TB). In addition, the discovery module 205 may store attributes of the probed entities. In one embodiment, the discovery module 205 stores the attribute data in the entity data set 240 as will be described hereafter. The discovery module 205 may report the event with a probe event reference.

An event reference such as a probe event reference, a self-announced event reference, and/or an initiated event reference may be organized as a data packet, a data array, a data file, or the like. In one embodiment, the event reference may include one or more data fields containing values specifying the event, the entity that the event occurred to, a time stamp, one or more attributes of the entity, and the like.

The monitor module 210 receives a self-announced event reference of the event if an entity communicates the self-announced event reference. Continuing the example above, the storage subsystem 140 may communicate an event reference to the monitor module 210 reporting the event of the storage capacity attribute changing from one terabyte (1 TB) to two terabytes (2 TB).

The configuration module 215 records the event as an initiated event reference if an administrator initiates the event. In the example above, if the administrator directs the storage subsystem 140 to be configured with the new storage capacity of two terabytes (2 TB), the configuration module 215 records the event of the change in the storage capacity attribute as an initiated event reference.

The event manager 220 synthesizes a report of the event from the event references. Continuing the example above, the event manager may synthesize a probe event reference for the detected attribute change of the storage subsystem 140, the self-announced event reference of the attribute change from the storage subsystem 140, and the initiated event reference into the report wherein the report details the event of the storage subsystem's attribute change.

The mapping module 225 stores attribute data for entities as records in the entity data set 240. In one embodiment the mapping module 225 receives a probe event reference from the discovery module 205, a self-announced event reference from the monitor module 210, and/or an initiated event reference from the configuration module 215. The mapping module 225 may parse the attribute data from the event references and store the attribute data in the entity data set 240.

In one embodiment, the mapping module 225 may parse and store attribute data differently, depending on the source. For example, the mapping module 225 may parse and store probe event references differently from self-announced event references.

The entity data set 240, snapshot data set 245, and preference data set 250 may each be configured as a database, a linked array of data fields, a flat file, or the like. In one embodiment, the entity data set 240, snapshot data set 245, and preference data set 250 are configured as tables of a database. In a certain embodiment, the entity data set 240, snapshot data set 245, and preference data set 250 are configured as columns of a database table.

In one embodiment, the detectability module 230 determines that an entity is not visible within the SAN 155 in response to the event. For example, if the discovery module 205 is unable to probe a specified entity, the discovery module 205 may report the event of being unable to probe the entity with a probe event reference. The detectability module 230 may determine that the specified entity is not visible within the SAN from the probe event reference.

In one embodiment, the change detection module 235 stores attribute data for a snapshot of the entity data set 240 in the snapshot data set 245. The change detection module 235 may copy or take a snapshot of a record for an entity in the entity data set 240 and store the snapshot in the snapshot data set 245 when the event manager 220 selects the entity and stores a record of the entity in the preference data set 250. Similarly, when the event manager 220 removes the entity selection from the preference data set 250, the change detection module 235 removes the record of the entity stored in the snapshot data set 245. The change detection module 235 may further detect an event as a difference between the entity data set 240 and snapshot data 245.

In one embodiment, the event manager 220 is further configured to receive a selection of one or more entities of interest from the administrator. For example, the administrator may select one or more entities from a graphical display of the SAN entities shown on a monitor. The event manager 220 may also receive selections of one or more attributes of interest from the administrator for each selected entity. In addition, the event manager 220 may record the selected attributes of the selected entities in the preference data set 250. In one embodiment, the entity data set 240 and/or the snapshot data set 245 only store the selected attributes for the selected entities as recorded n the preference data set 250. In addition, the discovery module 205 may only probe the selected entities recorded in the preference data set 250.

In one embodiment, the preference data set 250 specifies a group of selected entities. For example, the administrator may select two or more storage subsystems 140 of interest as a group. The event manager 220 may record the group selection in the preference data set 250 with the stipulation that the membership of the group may change over time. An event may apply to all entities in the dynamic group of selected entities.

The manager node 200 detects entity changes within the SAN 115, synthesizing a report from one or more event references of an event. The report is not limited to self-announced and/or initiated event references, but also includes probed event references from probing entities of the SAN 155 and events discovered from differences between the entity data set 240 and the snapshot data set 245. Thus, the administrator may learn the status of selected entities or all entities of the SAN 115 including entities that are not visible to the SAN 155.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
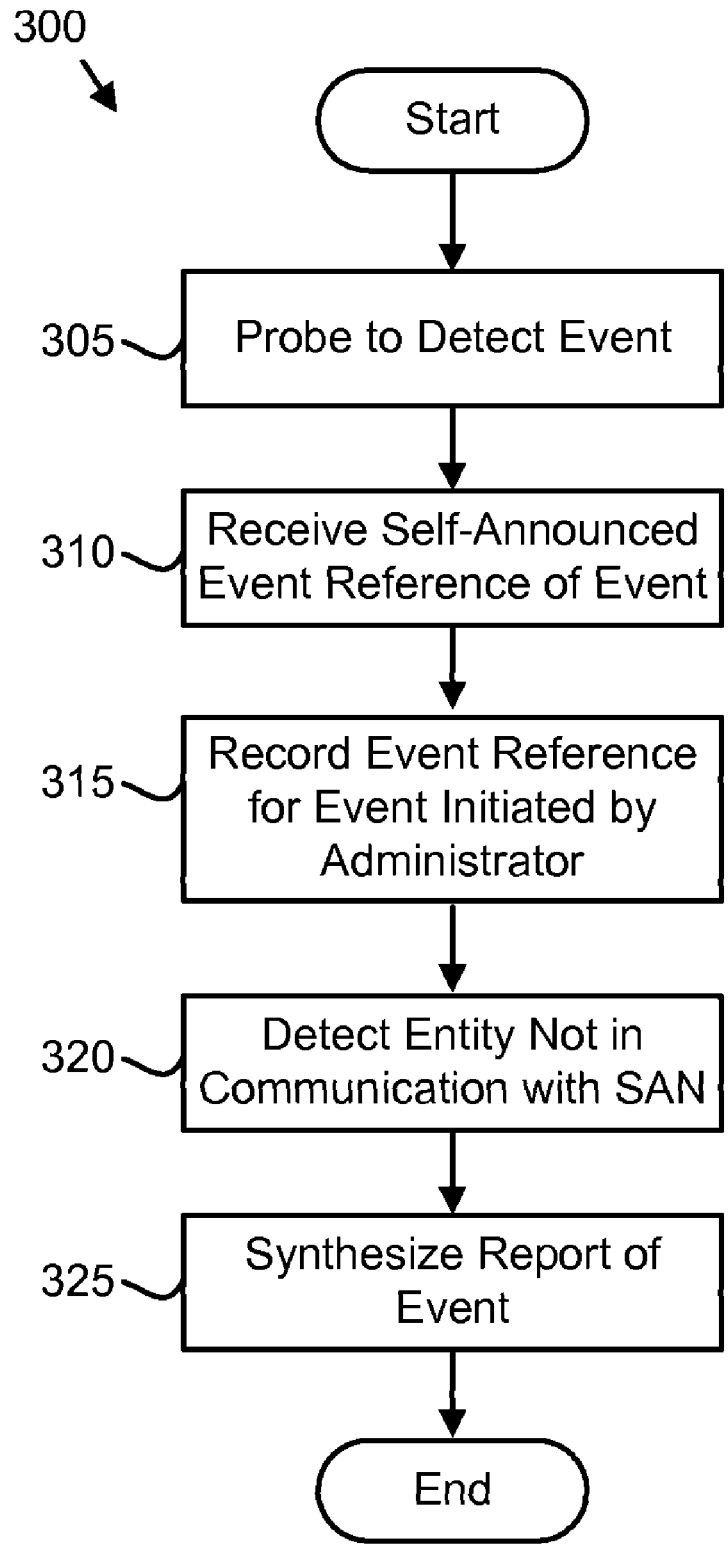
FIG. 3 is a schematic flow chart diagram illustrating one embodiment of a change detection method of the present invention.

FIG. 3 is a schematic flow chart diagram illustrating one embodiment of a change detection method 300 of the present invention. The method 300 substantially includes the steps to carry out the functions presented above with respect to the operation of the described apparatus 200 and system 100 of FIGS. 1-2.

The method 300 begins and the discovery module 205 probes 305 a plurality of entities of the SAN 155 to detect an event. The event may be a change in the attributes of an entity. Alternatively, the event may be an entity becoming visible within the SAN 155. Similarly, the event may be an entity becoming not visible within the SAN 155. The discovery module 205 further stores the attributes from the probed entities. For example, the discovery module 205 may store attribute data for the probed entities in the entity data set 240.

The discovery module 205 may probe 305 the entities of the SAN 155 in response to a policy. The policy may specify a time interval between probes 305 of the entities of the SAN 155. For example, the policy may specify that discovery module 205 probe 305 the entities of the SAN 155 every four (4) hours. Alternatively, the policy may direct that the discovery module 205 probe 305 the entities of the SAN 155 after a specified number of error messages have been logged. For example, the policy may require the discovery module 205 probe 305 the entities of the SAN 155 if over sixty (60) error messages are logged within an hour. A satisfaction of the policy may cause a host 110 to execute software processes of the discovery module 205 and initiate the probe 305. In a certain embodiment, the administrator may direct the discovery module 205 to probe 305 the entities of the SAN 155.

The monitor module 210 receives 310 a self-announced event reference of the event. An entity communicates the self-announced event reference to the monitor module 210. For example, a host 110 that connects to the SAN 155 may communicate the self-announced event reference wherein the self-announced event reference reports the connection of the host 110.

In one embodiment, the entity communicates the self-announced event reference through one or more communications channels such as the network 115, LAN 125, and/or storage network 150. The host 110 executing the software processes of the manager node 200 may receive 310 the self-announced event reference and direct the event reference to the monitor module 210.

The configuration module 215 records 315 the event as an initiated event reference if an administrator initiates the event. For example, the administrator may bring a storage server 130 online within the SAN 155. The SAN 155 may be configured to communicate an initiated event reference to the configuration module 215 in response to bringing the storage server 130 online.

In one embodiment, the detectability module 230 detects 320 an entity not in communication with the SAN 155. In a certain embodiment, the detectability module 230 may receive a probe event reference from the discovery module 205 in response to an event of the discovery module 205 being unable to communicate with an entity. The detectability module 230 may detect 230 the entity being not visible to the SAN 155 in response the event and the resulting probe event reference. In an alternate embodiment, the detectability module 230 compares the entity data set 240 with the snapshot data set 245. If the detectability module 230 determines that an existence of an entity is recorded in the snapshot data set 245 but not in the entity data set 240, the detectability module 230 may determine that the entity is no longer visible within the SAN 155.

The event manager 220 synthesizes 325 a report of the event from the event references. In one embodiment, the event manager 220 removes duplicate event references to an event so that each event is reported by at most one combined reference. For example, the event manager 220 may receive a probe event reference from the discovery module 205 of an entity beginning to communicate with the SAN 155, a self-announced event reference from the monitor module 210 of the entity communicating with the SAN 155, and an initiated event reference of the administrator bringing the entity online. The event manager 220 may consolidate the event references so that the event of the entity coming online is reported by one combined reference.

The method 300 detects changes to the SAN 155 and reports the event. Reported events includes events that are not self-announced by entities and initiated by the administrator. The method 300 may provide increased clarity into the function of the SAN 155 by providing the administrator with clear and concise reports on events.

Figure 4:
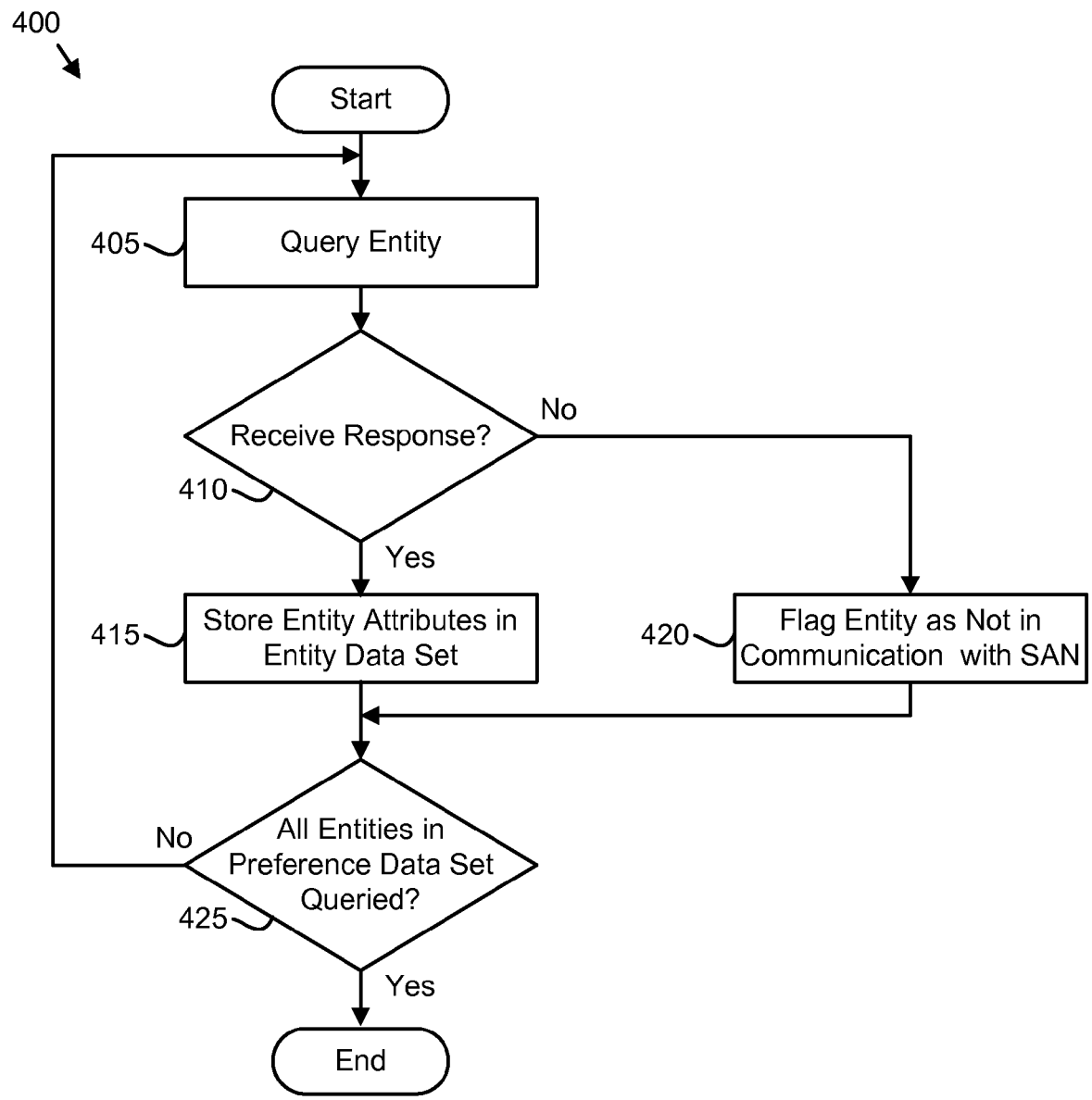
FIG. 4 is a schematic flow chart diagram illustrating one embodiment of a probing method of the present invention.

FIG. 4 is a schematic flow chart diagram illustrating one embodiment of a probing method 400 of the present invention. The method 400 describes one embodiment of the probe 305 to detect event step of the method 300 of FIG. 3. The description of the method 400 refers to elements of FIGS. 1-3, like numbers referring to like elements.

The method 400 begins and in one embodiment, the discovery module 205 queries 405 an entity. The discovery module 205 may address a query packet to the entity and communicate the query packet over one or more communications channels. In a certain embodiment, the query packet may include a request for the entity to respond to the query. For example, the query packet may be formatted as an extensible markup language (XML) file with a request for a reply and an address of the discovery module 205 and/or the host 110 of the discovery module 205. In addition, the query packet may include one or more requests for information about attributes of the entity. For example, the query to a storage subsystem 140 may include a request for the storage capacity of the storage subsystem 140. The query packet may also include an identifier identifying the query packet.

The discovery module 205 may further determine 410 if a response is received from the queried entity. In one embodiment, the discovery module 205 determines 410 that the response is received if the queried entity communicates a response packet to the discovery module 205. The response packet may include the identifier of the query packet to identify the response packet to the discovery module 205.

If the discovery module 205 determines 410 that a response is received, the mapping module 225 may store 415 attributes of the queried entity in the entity data set 240. Continuing the example above, if the query packet requested the storage capacity of the storage subsystem 140, the response packet may include a value such as two terabytes (2 TB) specifying the storage capacity. The mapping module 225 may store the two terabytes (2 TB) value in the entity data set 240 as an attribute for the storage subsystem 140. In addition, the discovery module 205 may report the event of the response with a probe event reference.

If the discovery module 205 determines 410 that a response is not received, the discovery module 205 may flag 420 the entity as not in communication with the SAN 155. In one embodiment, the discovery module 205 flags 420 the entity is not in communication with the SAN 155 if a response is not received within a specified reply time interval such as thirty seconds (30 s).

In a certain embodiment, the discovery module 205 may flag 420 the entity by writing a data value indicating that the entity is not in communication to a data field dedicated to communication status. The data field may be included in an entity data set entry for the queried entity. In one embodiment, the discovery module 205 generates a probe event reference. For example, if the discovery module 205 determines 410 that the entity is not in communication with the SAN 155, the discovery module 205 may generate the probe event reference that indicates the queried entity is not in communication.

In one embodiment, the discovery module 205 further determines 425 if all entities specified by the preference data set 250 are queried. For example, if the preference data set 250 records four thousand (4,000) entities, the discovery module 205 may determine 425 that all entities are queried if all four thousand (4,000) entities are queried within a specified time interval such as two (2) hours. In one embodiment, the discovery module 205 may write a time stamp value to a data field for the entity in the entity data set 240 and/or preference data set 250 each time the discovery module 205 queries 405 the entity. The discovery module 205 may use the time stamp value to determine 425 if all entities specified by the preference data set 250 are queried. In an alternate embodiment, the discovery module 205 determines 425 if all entities of the SAN 155 are queried.

If the discovery module 205 determines 425 that all entities specified by the preference data set 250 are not queried, the discovery module 205 queries 405 an un-queried entity. If the discovery module 205 determines 425 that all entities specified by the preference data set 250 are queried, the method 400 terminates. The method 400 probes entities in the SAN 155 to discover one or more events. Probing the SAN 155 allows the present invention to detect changes that may otherwise go unreported such as entities going offline.

Figure 5:
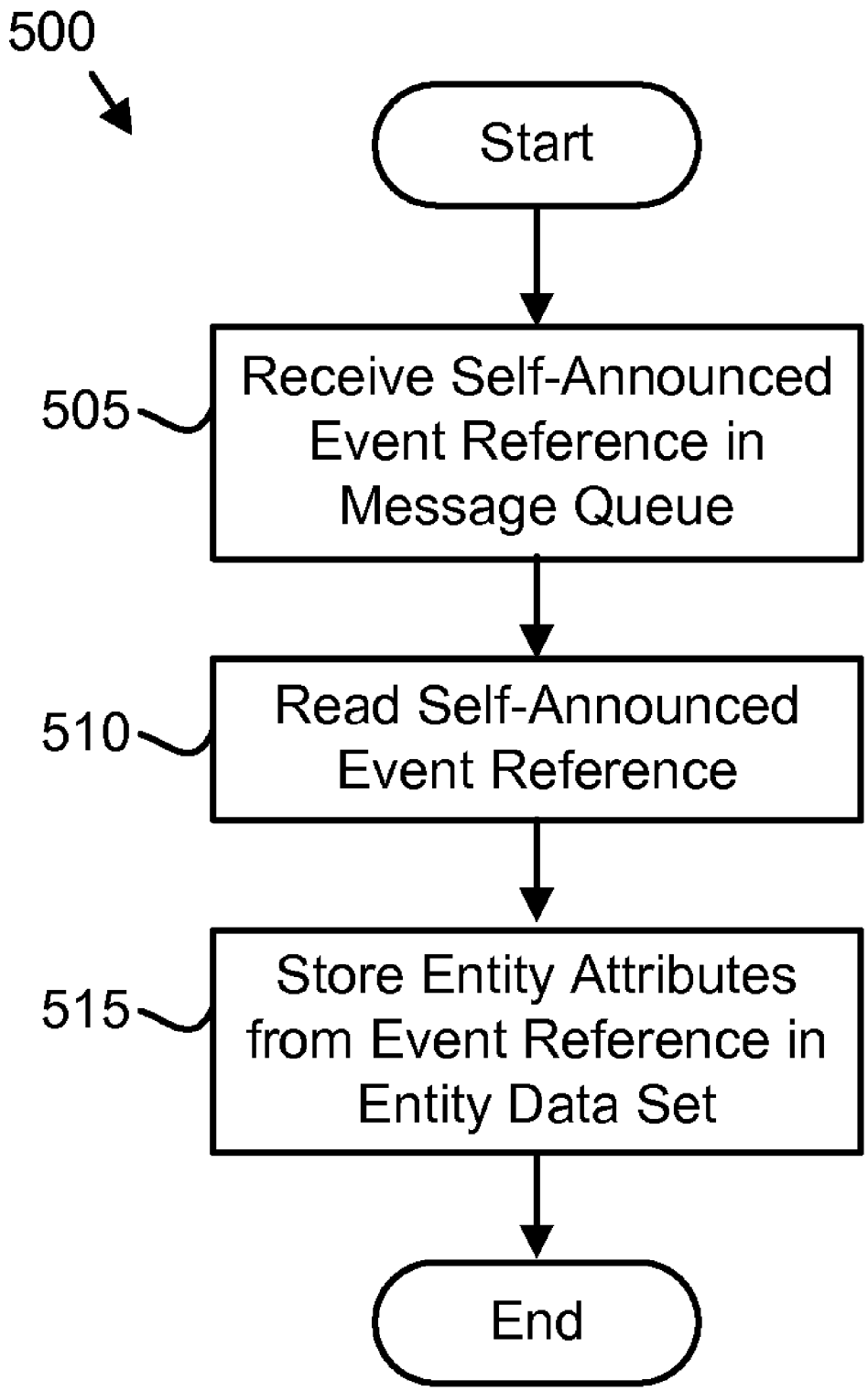
FIG. 5 is a schematic flow chart diagram illustrating one embodiment of a method for receiving self-announced event references of the present invention.

FIG. 5 is a schematic flow chart diagram illustrating one embodiment of a method 500 for receiving self-announced event references of the present invention. The method 500 describes one embodiment of the receive 310 self-announced event reference of event step of FIG. 3. In addition, the description of the method 500 refers to elements of FIGS. 1-4, like numbers referring to like elements.

The method 500 begins and in one embodiment, the monitor module 210 receives 505 a self-announced event reference in a message queue. The self-announced event reference may be configured as a data packet such as an XML file, a data array including a pointer to a data array, a data file, and the like. In one embodiment, the message queue is a host message queue. The self-announced event reference may include an identifier specifying that the reference be routed to the monitor module 210 executing on the host 110. The host 110 may take the self-announced event reference from the message queue and communicate the message to the monitor module 210.

The monitor module 210 may further read 510 the self-announced event reference. In one embodiment, the monitor module 210 parses the self-announced event reference to determine the event that is reports. For example, the monitor module 210 may parse a delimited field from an XML file self-announced event reference to recovery entity attribute data, wherein the delimited field demarks the attribute data. The delimited field may contain an alphanumeric value specifying a storage capacity such as four terabytes (4 TB).

The monitor module 210 may communicate the self-announced event reference and/or attribute data to the mapping module 225. The mapping module 225 may store 515 the entity attribute data in the entity data set 240 and the method 500 terminates. Continuing the example above, the mapping module 225 may write the storage capacity value for the entity to a data field that records the storage capacity of the entity in the entity data set 240. The method 500 receives self-announced event references, allowing entities to communicate an event such as a change in attributes.

Figure 6:
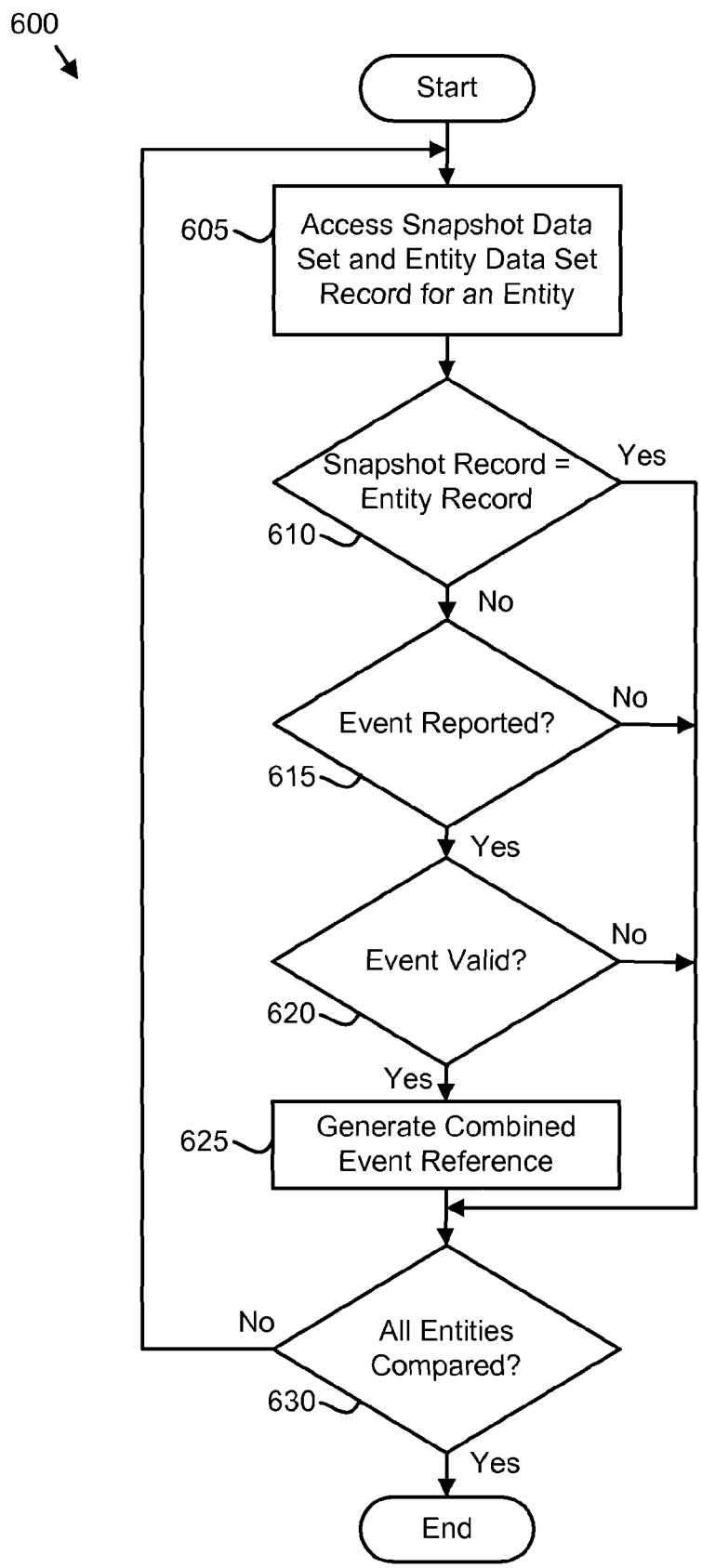
FIG. 6 is a schematic flow chart diagram illustrating one embodiment of a report synthesis method of the present invention.

FIG. 6 is a schematic flow chart diagram illustrating one embodiment of a report synthesis method 600 of the present invention. The method 600 may embody the synthesize 325 report of event step of FIG. 3. The description of the method 600 may refer to elements of FIGS. 1-5, like numbers referring to like elements.

The method 600 begins and in one embodiment, the event manager 220 accesses 605 records from the entity data set 240 and the snapshot data set 245 for a specified entity. In a certain embodiment, the event manager 220 accesses 605 only records for entities recorded in the preference data set 250.

The snapshot data set 245 records instances of entity data set records. In one embodiment, the snapshot data set 245 records instances of entity data set records for entities recorded in the preference data set 250. For example, the snapshot data set 245 may record a snapshot of an entity data set record after a change is detected for a corresponding entity if the entity is recorded in the preference data set 250. Alternatively, the snapshot data set 245 records a specified instance of entity data set 240. For example, the snapshot data set 245 may record all entries of the entity data set 240 as of 1:00 p.m. The recording of data to the snapshot data set 245 will be described in more detail hereafter. The entity data set 240 records current attribute data for the entity. Thus the mapping module 225 may record recently received attribute data to the entity data set 240, while the snapshot data set 245 stores a snapshot of the entity data set 240 from a previous specified time.

In one embodiment, the change detection module 230 determines 610 if the entity data set record is substantially equivalent to the snapshot data set record for the entity. The change detection module 230 may compare a time stamp value of the entity data set record to a time stamp value of the snapshot data set record to determine if the entity data set record is modified after the creation of the snapshot data set record. Alternatively, the change detection module 230 may compare each data field of the entity data set record to a corresponding data field of the snapshot data set record to determine 610 if the entity data set record is substantially equivalent to the snapshot data set record for the entity.

In one embodiment, if the change detection module 230 determines 610 that the entity data set record is not substantially equivalent to the snapshot data set record for the entity, the event manager 610 determines 615 if an event for the entity is reported by the discovery module 205, the monitor module 210, and the configuration module 215. The event manager 220 may determine 615 that the event is report if the discovery module 205 reported a probe event reference, if the monitor module received a self-announced event reference, and/or if the configuration module 215 records an initiated event reference.

If the event manager 220 determines 615 that the event for the entity is reported, the event manager 220 determines 620 if the event is valid. In one embodiment, the event is valid if reported within a specified reporting time interval. For example, if the reporting time interval is three hundred seconds (300 s), the event manager 220 may determine 615 that the event is valid if one or more event references for the event are received in the previous three hundred seconds (300 s).

In an alternate embodiment, the event manager 220 determines 615 that the event is valid if the event is not a false positive. For example, if the configuration module 215 records 315 an initiated event reference for a storage subsystem 140 being taken offline, and the discovery module 205 subsequently reports that the storage subsystem 140 is still online, the event manager 220 may determine 615 that the event is not valid as a false positive.

If the event manager 220 determines 620 that the event is valid, the event manager 220 may generate 625 a combined reference for the event. For example, if the event is a change in storage capacity for a storage subsystem 140, the event manager 220 may combine a probe event reference specifying the storage capacity attribute for the storage subsystem 140 as two terabytes (2 TB), a self-announced event reference from the storage subsystem 140 that the storage capacity for the storage subsystem 140 is changed, and an initiated event reference directing the reduction of the storage capacity of the storage subsystem 140 to two terabytes (2 TB) into a single combined reference that reports the storage subsystem storage capacity as two terabytes (2 TB).

If the event manager generates 625 the combined event reference, the change detection module 230 determines 610 that the entity data set record is substantially equivalent to the snapshot data set record for the entity, the event manager 220 determines 615 that the event for the entity is not reported, and/or the event manager 220 determines 620 that the event is not valid, the event manager 220 determines 630 if entity data set records and snapshot data set records for all entities are compared. If the entity data set records and snapshot data set records for all entities are not compared, the event manager 220 accesses 605 an entity data set record and a snapshot data set record for another entity.

If the event manager 220 determines 630 that the entity data set records and snapshot data set records for all entities are compared, the method 600 terminates. The method 600 generates combined event references for events in the SAN 155. A combined reference may comprise a report that is communicated to the administrator. Alternative, the event manager 220 may communicate one or more combined event references as the report to the administrator.

Figure 7:
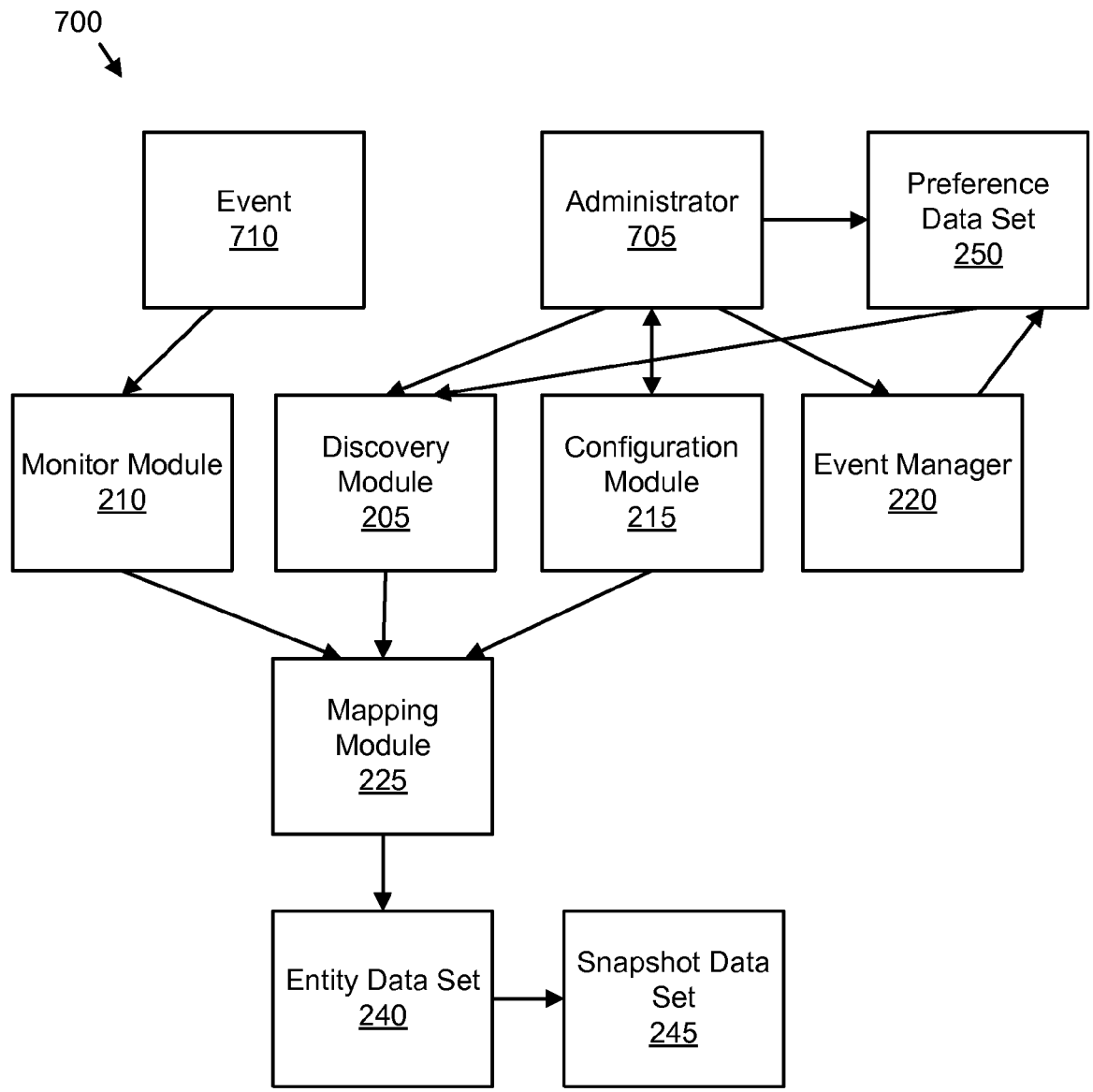
FIG. 7 is a schematic block diagram illustrating one embodiment of a data set generation process of the present invention.

FIG. 7 is a schematic block diagram illustrating one embodiment of a data set generation process 700 of the present invention. The process 700 shows one embodiment of populating the entity data set 240, snapshot data set 245, and preference data set 250. The description of the process 700 refers to elements of FIGS. 1-6, like numbers referring to like elements.

In one embodiment, the administrator 705 provides the event manager 220 with selections of one or more entities of interest. The administrator may also provide the event manager 220 with selections for attributes for each entity. The event manager 220 may store the selections of entities and attributes to the preference data set 250. In an alternate embodiment, the administrator 705 may provide the selections of entities and attributes directly to the preference data set 250. For example, the preference data set 250 may be configured as a database, and a database application may receive the selections of the entities and the attributes as is well known to those of skill in the art. In one embodiment, the administrator 705 provides the entity and attribute selections through a keyboard, a mouse, or the like in response to promptings displayed on a monitor.

The preference data set 250 records the entity selections. In one embodiment, the preference data set 250 records one or more data fields for each selected entity. The data fields may be configured to identify the entity and to identify attributes of the entity. The preference data set 250 may further record selected attribute values for each entity. The preference data set 250 may be used to limit change detection to a subset of the SAN 155 that is of particular interest to the administrator.

The discovery module 205, monitor module 210, and configuration module 215 may communicate event references to the mapping module 225. For example, the discovery module 205 may probe 305 an entity and generate a probe event reference that is communicated to the mapping module 225 in response to detecting an event 710 for the entity. In one embodiment, the administrator 705 directs the discovery module 205 to probe 305 the SAN 155. Similarly, the configuration module 215 may communicate an initiated event reference for an event 710 initiated by the administrator 705. The monitor module 210 may communicate a self-announced event reference communicated by the entity in response to an event 710.

The mapping module 225 stores attribute data for the entity in the entity data set 240. In one embodiment, the mapping module 225 only stores attribute data for entities that are recorded in the preference data set 250. For example, if a host 110 is not recorded in the preference data set 250, the mapping module 225 may not record attribute data for the host 110.

When the event manager 220 records an entity selection in the preference data set 250, the change detection module 235 may copy or take a snapshot of the record for the entity in the entity data set 240 and store the snapshot in the snapshot data set 245. Similarly, when the event manager 220 removes the entity selection from the preference data set 250, the change detection module 235 removes the record of the entity stored in the snapshot data set 245.

The process 700 may record selected entities and attributes for the selected entities in the preference data set 250. In addition, the process 700 may record current values of the selected attributes for the selected entities of the preference data set 250 to the entity data set 240 and an instance of the entity data set in the snapshot data set 245. By comparing the recorded attribute values of the entity data set 240 with the recorded entity values of one or more instances of the snapshot data set 250, the present invention may detect changes to the SAN 155.

Figure 8:
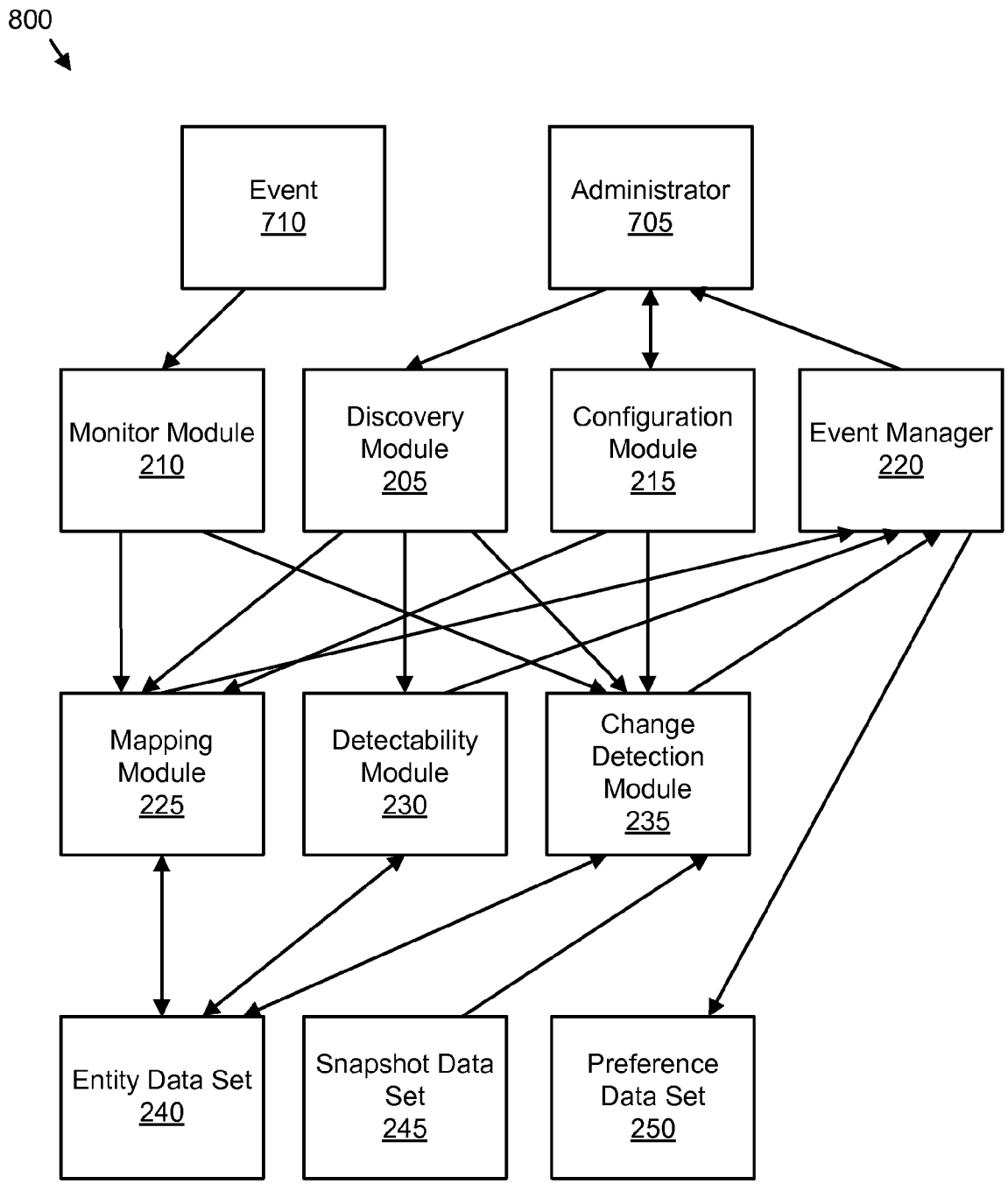
FIG. 8 is a schematic block diagram illustrating one embodiment of a change detection process of the present invention.

FIG. 8 is a schematic block diagram illustrating one embodiment of a change detection process 800 of the present invention. The process 800 shows one implementation of the change detection process 300 of FIG. 3 using the manager node 200 of FIG. 2 to detect changes in system 100 of FIG. 1. The description of the process 800 may refer to elements of FIGS. 1-7, like numbers referring to like elements.

The discovery module 205 probes 305 an entity of the SAN 155 to detect an event 710 and may communicate a probe event reference of the event 710 to the mapping module 225. The monitor module 210 receives 310 a self-announced event reference of the event 710 if the entity communicates the self-announced event reference, and communicates the self-announced event reference to the mapping module 225. The configuration module 215 records 315 the event 710 as an initiated event reference if the event 710 is initiated by the administrator 705 and communicates the initiated event reference to the mapping module 225. The mapping module 225 may record attributes for the entity in the entity data set 240 from the event references. In one embodiment, the mapping module 225 only records selected attributes for selected entities as specified by the preference data set 250.

The discovery module 205, monitor module 210, and configuration modules 215 may also communicate the event references to the detectability module 230 and the change detection module 235. In one embodiment, the mapping module 225 communicates the event references to the event manager 220. Alternative, the discovery module 205, monitor module 210, and configuration modules 215 may also communicate the event references directly to the event manager 220.

The change detection module 235 may determine 610 that there is a difference between the entity data set 240 and the snapshot data set 250 to detect a change. Alternatively, the change detection module 235 may detect a change using the event references received from the discovery module 205, monitor module 210, and configuration module 215. The change detection module 235 may communicate the detection of the change to the event manager 220. In one embodiment, the change detection module 235 only communicates the detection of a change in a selected attribute of a selected entity recorded in the preference data set 250. In a certain embodiment, the change detection module 235 communicates an event reference of the detected change.

In one embodiment, the change detection module 235 updates the snapshot data set 245 with a record copied from the entity data set 240 after detecting the change. For example, if the change detection module 235 determines 610 that an entity data set record for a storage subsystem 140 is different from a snapshot data set record for the storage subsystem 140, the change detection module 235 communicates an event reference for the detected change and copies the entity data set record for the storage subsystem 140 to the snapshot data set 245 so that change to the storage subsystem 140 is only detected once by the change detection module 235.

The detectability module 230 may detect 320 that the entity is not visible within the SAN 155. The detection may be in response to an event 710 such as may be indicated by the detectability module 230 receiving one or more event references from the discovery module 205, the monitor module 210, and the configuration module 215. The detectability module 230 may communicate the detection to the event manager 220. In one embodiment, the detectability module 230 only detects 320 that an entity is not visible within the SAN 155 if the entity is a selected entity specified by the preference data set 250.

The event manager 220 synthesizes 325 a report of the event from the event references and communicates the report to the administrator 705. The event manager 220 may also record selected entities and entity attributes from the administrator 705 in the preference data set 250.

The embodiment of the present invention detects changes to entities in the SAN 155. In addition, the present invention may synthesize 325 a concise report of the events 710 comprising each change. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to detect entity changes in a storage area network (SAN) and to report entity changes using multiple references for a single event, the apparatus comprising a processor and:
   a discovery module configured to:
   probe a plurality of entities of a SAN by directly querying the plurality of entities to detect a first event of one of a plurality of possible events in response to a policy;
   store attributes of the probed entities; and
   report the first event with a probe event reference, wherein the plurality of entities are configured to generate a response in response to receiving a query from the discovery module;
   a monitor module configured to receive a self-announced event reference of the first event in response to an entity communicating the self-announced event reference, which self-announced event reference is autonomously generated by one or more of the plurality of entities in response to the first event;
   a configuration module configured to record the first event as an initiated event reference that indicates that the first event was initiated by an administrator in response to determining that the first event is initiated by the administrator; and
   an event manager configured to:
   determine if the first event is valid using multiple references, the multiple references comprising probe event references generated for the first event, self-announced event references generated for the first event, and initiated event references generated for the first event,
   synthesize a report comprising an entry for a plurality of events in the SAN, including an entry for the first event, wherein the entry for the first event in the report is generated from the multiple references for the first event, wherein the report is displayed for the administrator.

2. The apparatus of claim 1, wherein the event manager synthesizes the report by removing duplicate event references, wherein each event is reported by at most one combined reference.

3. The apparatus of claim 1, wherein the event is selected from an attribute change for an entity, a new entity becoming visible within the SAN, and an entity previously visible within the SAN becoming no longer visible within the SAN, wherein the entity becoming no longer visible within the SAN is selected from the entity becoming no longer visible within the SAN because the entity cannot be communicated with and entity becoming no longer visible within the SAN because the entity is not present within the SAN.

4. The apparatus of claim 1, further comprising a detectability module configured to determine that an entity is not visible within the SAN, in response to a probe event reported by the discovery module.

5. The apparatus of claim 1, wherein the event manager is further configured to:
   receive selections of one or more entities of interest from the administrator, wherein the selections represent a subset of the entities in the SAN;
   receive selections of one or more attributes of interest from the administrator for each selected entity; and
   record the selected attributes of the selected entities in a preference data set.

6. The apparatus of claim 5, further comprising a mapping module configured to store attribute data for the plurality of entities in an entity data set.

7. The apparatus of claim 6, further comprising a change detection module configured to:
   store attribute data for a snapshot of the entity data set in a snapshot data set; and
   detect an event as a difference between the entity data set and the snapshot data set.

8. A computer program product comprising a computer useable medium having a computer readable program for detecting entity changes in a storage area network (SAN) and reporting entity changes using multiple references for a single event, wherein the computer readable program when executed on a computer causes the computer to:
   probe a plurality of entities of a SAN by directly querying the plurality of entities to detect a first event of one of a plurality of possible events in response to a policy and store attributes of the probed entities, wherein the first event is reported with a probe event reference, wherein the plurality of entities are configured to generate a response in response to receiving a query from the discovery module;
   receive a self-announced event reference of the first event in response to an entity communicating the self-announced event reference, which self-announced event reference is autonomously generated by one or more of the plurality of entities in response to the first event;
   record the first event as an initiated event reference in response to determining that the first event is initiated by an administrator;
   determine if the first event is valid using multiple references, the multiple references comprising probe event references generated for the first event, self-announced event references generated for the first event, and initiated event references generated for the first event; and
   synthesize a report comprising an entry for a plurality of events in the SAN, including an entry for the first event, wherein the entry for the first event in the report is generated from the multiple references for the first event, the multiple references comprising the probe event references generated for the first event, wherein the report is displayed for the administrator.

9. The computer program product of claim 8, wherein the computer readable code is further configured to cause the computer to synthesize the report by removing duplicate event references, wherein each event is reported by at most one combined reference.

10. The computer program product of claim 8, wherein the computer readable code is further configured to cause the computer to delete the report in response to determining the event is a false positive.

11. The computer program product of claim 8, wherein the computer readable code is further configured to cause the computer to delete the report in response to determining the event occurred prior to a specified time interval.

12. The computer program product of claim 8, wherein the event is selected from an attribute change for an entity, a new entity becoming visible within the SAN, and an entity previously visible within the SAN becoming no longer visible within the SAN.

13. The computer program product of claim 12, wherein the entity is no longer visible within the SAN if the entity cannot be communicated with.

14. The computer program product of claim 12, wherein the entity is no longer visible within the SAN if the entity is not present within the SAN.

15. The computer program product of claim 8, wherein the computer readable code is further configured to cause the computer to determine that an entity is not visible within the SAN in response to the event.

16. The computer program product of claim 8, wherein the computer readable code is further configured to cause the computer to:
    receive selections of one or more entities of interest from the administrator, wherein the selections represent a subset of the entities in the SAN;
    receive selections of one or more attributes of interest from the administrator for each selected entity; and
    record the selected attributes of the selected entities in a preference data set.

17. The computer program product of claim 16, wherein the computer readable code is further configured to cause the computer to store attribute data for the plurality of entities in an entity data set.

18. The computer program product of claim 17, wherein the entity data set only stores the selected attributes of the selected entities of the preference data set.

19. The computer program product of claim 17, wherein the computer readable code is further configured to cause the computer to store attribute data for a snapshot of the entity data set in a snapshot data set.

20. The computer program product of claim 19, wherein the snapshot data set only stores selected attributes of the selected entities of the preference data set.

21. The computer program product of claim 19, wherein the computer readable code is further configured to cause the computer to detect the event as the difference between the entity data set and the snapshot data set.

22. The computer program product of claim 16, wherein the computer readable code is further configured to only probe selected entities of the preference data set.

23. The computer program product of claim 8, wherein the policy is configured as a probing schedule.

24. A system to detect entity changes in a storage area network (SAN) and to report entity changes using multiple references for a single event, the system comprising:
    a SAN comprising a plurality of entities;
    a manager node configured to manage the SAN and comprising:
        a discovery module configured to:
            probe the SAN by directly querying the plurality of entities to detect a first event of one of a plurality of possible events in response to a policy;
            store attributes of the probed entities; and
            report the first event with a probe event reference, wherein the plurality of entities are configured to generate a response in response to receiving a query from the discovery module;
        a monitor module configured to receive a self-announced event reference of the first event in response to an entity communicating the self-announced event reference, which self-announced event reference is autonomously generated by one or more of the plurality of entities in response to the first event;
        a configuration module configured to record the first event as an initiated event reference in response to determining that the first event is being initiated by an administrator of the SAN; and
        an event manager configured to:
            determine if the first event is valid using multiple references, the multiple references comprising probe event references generated for the first event, self-announced event references generated for the first event, and initiated event references generated for the first event,
            synthesize a report comprising an entry for a plurality of events in the SAN, including an entry for the first event, wherein the entry for the first event in the report is generated from the multiple references for the first event,
            wherein synthesizing the report comprises the event manager removing duplicate event references such that the first event is reported by at most one combined reference created from the probe event references, self-announced event references, and initiated event references for the first event, and wherein the report is displayed for the administrator.

25. The system of claim 24, wherein the event is selected from an attribute change for an entity, a new entity becoming visible within the SAN, and an entity previously visible within the SAN becoming no longer visible within the SAN.

26. The system of claim 24, the manager node further comprising a detectability module configured to determine that an entity is not visible within the SAN by leveraging the capabilities of the discovery module.

27. The system of claim 24, wherein the event manager is further configured to receive selections of one or more entities of interest from the administrator;
    receive selections of one or more attributes of interest from the administrator for each selected entity; and
    record the selected attributes of the selected entities in a preference data set.

28. The system of claim 27, the manager node further comprising a mapping module configured to store attribute data for the plurality of entities in an entity data set.

29. The system of claim 28, the manager node further comprising a change detection module configured to:
    store attribute data for a snapshot of the entity data set in a snapshot data set; and
    detect an event as the difference between the entity data set and the snapshot data set.

30. A method for deploying computer infrastructure, comprising integrating computer-readable code for detecting entity changes in a storage area network (SAN) and reporting entity changes using multiple references for a single event into a computing system, wherein the code in combination with the computing system is capable of performing the following:
    probing a plurality of entities of a SAN by directly querying the plurality of entities to detect a first event of a plurality of possible events in response to a policy;
    storing attributes of the probed entities;
    wherein the first event detected through probing is reported with a probe event reference, wherein the plurality of entities are configured to generate a response in response to receiving a probe query;
    receiving a self-announced event reference of the first event in response to an entity communicating the self-announced event reference, which self-announced event reference is autonomously generated by one or more of the plurality of entities in response to the first event;

recording the first event as an initiated event reference in response to determining that the first event is initiated by an administrator;

determining if the first event is valid using multiple references, the multiple references comprising probe event references generated for the first event, self-announced event references generated for the first event, and initiated event references generated for the first event; and synthesizing a report comprising an entry for a plurality of events in the SAN, including an entry for the first event, wherein the entry for the first event in the report is generated from the multiple references for the first event, and wherein synthesizing the report comprises removing duplicate event references such that the first event is reported by at most one combined reference created from the probe event references, self-announced event references, and initiated event references for the first event, and wherein the report is displayed for the administrator.

31. The method of claim 30, wherein the method comprises deleting the report in response to a determination selected from determining the event is a false positive and determining the event occurred prior to a specified time interval.

32. The method of claim 30, wherein the event is selected from an attribute change for an entity, a new entity becoming visible within the SAN, and an entity previously visible within the SAN becoming no longer visible within the SAN.

33. The method of claim 30, the method further comprising:

receiving selections of one or more entities of interest from the administrator, wherein the selections represent a subset of the entities in the SAN;

receiving selections of one or more attributes of interest from the administrator for each selected entity;

recording the selected attributes of the selected entities in a preference data set; and storing attribute data for the selected attributes of the selected entities in an entity data set.

34. The method of claim 33, further comprising:

storing attribute data for a snapshot of the entity data set in a snapshot data set, wherein the snapshot data set only stores selected attributes of the selected entities of the preference data set; and detecting an event as the difference between the entity data set and the snapshot data set.

35. An apparatus to detect entity changes in a storage area network (SAN) and to report entity changes using multiple references for a single event, the apparatus comprising a processor and configured to execute operations for:

probing a plurality of entities of a SAN by directly querying the plurality of entities to detect a first event of a plurality of possible events in response to a policy and storing attributes of the probed entities, wherein the first event is reported with a probe event reference, wherein the plurality of entities are configured to generate a response in response to receiving a query from the discovery module;

receiving a self-announced event reference of the first event in response to an entity communicating the self-announced event reference, which self-announced event reference is autonomously generated by one or more of the plurality of entities in response to the first event;

recording the first event as an initiated event reference in response to the first event being initiated by an administrator;

receiving selections of one or more entities of interest from the administrator;

receiving selections of one or more attributes of interest from the administrator for each selected entity;

recording the selected attributes of the selected entities in a preference data set;

storing attribute data for the selected attributes of the selected entities in an entity data set;

storing attribute data for a snapshot of the entity data set in a snapshot data set, wherein the snapshot data set only stores selected attributes of the selected entities of the preference data set;

detecting a first event as the difference between the entity data set and the snapshot data set;

determining if the first event is valid using multiple references, the multiple references comprising probe event references generated for the first event, self-announced event references generated for the first event, and initiated event references generated for the first event; and synthesizing a report comprising an entry for a plurality of events in the SAN, including an entry for the first event, wherein the entry for the first event in the report is generated from the multiple references for the first event, wherein the report is displayed for the administrator.

\* \* \* \* \*